United States Patent [19]
Clock et al.

[11] 3,762,988
[45] Oct. 2, 1973

[54] INTERLAYER AND LAMINATED PRODUCT

[75] Inventors: Gerald E. Clock, Midland; Charles N. Brown, Bay City, both of Mich.

[73] Assignee: The Dow Chemical Company, Midland, Mich.

[22] Filed: Aug. 9, 1971

[21] Appl. No.: 169,935

[52] U.S. Cl.............. 161/183, 161/190, 161/203, 161/204, 161/227, 161/249, 161/253, 161/254
[51] Int. Cl.................... B32b 17/10, B32b 27/08
[58] Field of Search............... 161/183, 190, 192, 161/199, 203, 204, 227, 249, 253, 254

[56] References Cited
UNITED STATES PATENTS

| | | | |
|---|---|---|---|
| 3,582,455 | 6/1971 | Delap et al. | 161/203 |
| 3,622,440 | 11/1971 | Snedeker et al. | 161/203 |
| 3,344,014 | 9/1967 | Rees | 161/203 |
| 3,057,505 | 10/1962 | Chapman et al. | 161/203 |
| 2,400,139 | 5/1946 | Roland | 161/203 |

*Primary Examiner*—Daniel J. Fritsch
*Attorney*—W. M. Yates et al.

[57] ABSTRACT

A safety glass interlayer in the form of a laminate comprises the combination of a core layer of a normally solid, synthetic, polymer material such as an ionic copolymer and a load distribution layer of a normally solid, synthetic, polymer material such as a copolymer of styrene and butadiene on either side of and bonded to the core layer. A laminated product suitable for use as safety glass includes at least two layers of glass having the interlayer disposed between and in mating relationship with the glass layers. The interlayer can be produced by coextruding the polymers under conditions to obtain the product desired. The laminated product can be produced by disposing the interlayer between two sheets of glass and effecting a bond between the mating surfaces under suitable conditions of temperature and pressure in a platen press or the like.

12 Claims, 3 Drawing Figures

PATENTED OCT 2 1973 3,762,988

INVENTORS.
Gerald F. Clock
BY Charles N. Brown

Ralph M. Mellom
ATTORNEY

INTERLAYER AND LAMINATED PRODUCT

This invention relates to laminated products. In one aspect, this invention relates to laminated safety glass. In another aspect, this invention relates to interlayers for safety glass and the like.

The laminating art is replete with various and sundry types of laminated products wherein two or more sheets of organic polymer materials are bonded together. Laminates of two layers of glass and an interlayer of an organic polymer material disposed between the glass layers are also widely known and described in the literature and patent art. Safety glass laminates in the form of a layer of poly(vinyl butyral), for example, disposed between two layers of glass are enjoying widespread commercial use as windshields in vehicles such as automobiles. The poly(vinyl butyral) interlayer in the safety glass functions to retain some of the glass fragments and splinters produced when the glass is shattered such as could occur when the vehicle is involved in a collision or the like. The poly(vinyl butyral) also moderately improves the strength characteristics of the glass so that in the event of a mishap an occupant in the vehicle is hopefully prevented from pentrating the windshield. Other organic polymer materials have been used as interlayers in laminated safety glass but for one reason or another they have not been commerically accepted like the poly(vinyl butyral).

Some of the criteria which are employed to determine whether or not a laminated product is satisfactory as safety glass includes the resistance of the laminate to penetration by an impacting object, the load bearing properties of the laminate after one or more of the glass layers have been shattered, the degree of adhesion between the glass layers and the thermoplastic interlayer, and the ability of the thermoplastic interlayer to retain glass fragments which result when one or more of the glass layers becomes shattered. The two latter criteria are important in providing so-called cosmetic protection to minimize lacerative type injuries in the event of glass breakage. The optical properties of the safety glass laminate are also important, particularly when the laminate is to be used as a vehicle windshield.

The National Highway Safety Bureau has established motor vehicle safety standards which serve as guidelines for providing crash protection to occupants of passenger cars, multipurpose passenger vehicles, trucks, and buses. These safety standards include provisions which set forth the minimum acceptable impact strength for laminated safety glass windshields in various types of vehicles. While it is obviously desirable that laminated windshields have acceptable impact strength at low, medium, and high temperatures, to provide occupants with protection throughout the normal range of environmental temperatures, it is a fact that many of the conventional windshields including those containing poly(vinyl butyral) do not satisfy the minimum strength requirements at low temperatures or at high temperatures. Some of the factors which affect the quality of laminated safety glass are the tensile strength of the thermoplastic interlayer at various temperatures, the elongation of the interlayer for a given load at various temperatures, the adhesion retention properties of the interlayer to the glass layers, the tear strength of the interlayer at various temperatures, and the reisistance of the interlayer to cut-through by glass splinters resulting from the force of an impacting object. Many of the prior art safety glass laminates, including those in commercial use, are constructed of materials which are inferior in terms of providing the quality desired by contemporary standards.

According to this invention, these and other disadvantages of the prior art laminated safety glass are overcome by an interlayer in the form of a laminate comprising in combination, a core layer of a normally solid, synthetic, organic polymer material having an ultimate tensile strength of at least about 1,000 psi, an ultimate elongation of at least about 25 percent, and, when the ultimate tensile strength is between about 1,000 and about 3,500 psi, the polymer material of the core layer has an ultimate elongation in percent which is at least equal to the value obtained by the expression $$UE_{1000-3500} = 270 - (0.07) \text{ (ultimate tensile strength)}$$

and a load distribution layer on either side of and bonded to said core layer, said load distribution layer being fabricated of a normally solid, synthetic, organic polymer material having a minimum height to puncture of at least about one inch and a minimum height to tear of at least about one and one-half inche as determined by ASTM Designation D2582-67 using a one-quarter pound carriage and when the polymer material of said load distribution layer is torn by being subjected to the tear propagation procedure set forth in ASTM Designation D1938-67, the resulting edges of the tear are wavy and uneven. Thus, the polymer material of the core layer has an ultimate tensile strength which is greater than 1,000 psi and an ultimate elongation which is greater than 25 percent and, when the ultimate tensile strength of the polymer material is between about 1,000 and about 3,500 psi, the ultimate elongation is greater than a value inversely proportional in a linear manner to the ultimate tensile strength in the ultimate elongation range between about 25 and about 200 percent. The ultimate tensile strength and the ultimate elongation in this and other embodiments of the invention herein disclosed are determined by ASTM Designation D638-68 (Type one with a specimen gauge length of 0.5 inch) at a rate of 5,000 inches per minute.

In a specific embodiment of the invention, the core layer is fabricated of a normally solid, synthetic, organic, thermoplastic polymer material selected from the group consisting of an ionic copolymer of an α-olefin having up to and including six carbon atoms per molecule and an α,β-ethylenically unsaturated carboxylic acid selected from the group consisting of monocarboxylic acids and dicarboxylic acids each having up to and including eight carbon atoms per molecule, said ionic copolymer having at least about 10 percent of the carboxylic groups ionized by neutralization with a salt-forming cation; a copolymer of an aliphatic conjugated diolefin having between four and eight carbon atoms per molecule and an alkenyl aromatic compound having up to and including 12 carbon atoms per molecule, said copolymer having an ultimate tensile strength of at least about 1,000 psi, an ultimate elongation of at least about 25 percent, and, when the ultimate tensile strength is between about 1,000 and about 3,500 psi, said copolymer has an ultimate elongation in percent which is at least equal to the value obtained by the expression $$UE_{1000-3500} = 270 - (0.07)(\text{ultimate tensile strength});$$

alkyl ethers of cellulose wherein each alkyl group of said ether contains up to and including seven carbon atoms per molecule; organic acid esters of cellulose wherein each organic acid group of said ester contains up to and including seven carbon atoms per molecule; polyurethane; nylon; polycarbonate; and plasticized poly(vinyl chloride); and the load distribution layers are fabricated of a normally solid, synthetic, organic, thermoplastic polymer material selected from the group consisting of an ethylene polymer, a polymer of an aliphatic conjugated diolefin having between four and six carbon atoms per molecule, and a copolymer of an aliphatic conjugated diolefin having between four and six carbon atoms per molecule and an alkenyl aromatic compound having up to and including 12 carbon atoms per molecule. A laminated product of this invention comprises at least two layers of glass having an interlayer as defined above disposed therebetween and in mating relationship therewith. In another embodiment of the invention, the disadvantages of the prior art laminated products are overcome by a laminated product comprising at least two layers of glass and an interlayer disposed therebetween and in mating relationship therewith, said interlayer being fabricated of a normally solid, synthetic, thermoplastic coplymer of an aliphatic conjugated diolefin having between four and six carbon atoms per molecule and an alkenyl aromatic compound having up to and including 12 carbon atoms per molecule, said copolymer having a tensile strength of at least about 1,300 psi at an elongation of 300 percent.

Accordingly, it is an object of this invention to provide an improved safety glass interlayer.

Another object of this invention is to provide an improved laminated product.

A further object of this invention is to improve the physical properties of laminated safety glass.

Yet another object of this invention is to improve the impact strength of laminated safety glass.

A further object of this invention is to provide greater protection to occupants of vehicles in the event the vehicle becomes involved in a collision.

A further object of the invention is to provide occupants of a vehicle with increased protection against laceration from broken glass in the event the vehicle is involved in a collision.

These and other objects of the invention will become apparent to one skilled in the art after studying the following detailed description, the appended claims, and the accompanying drawing wherein:

Referring now to the drawing, wherein like reference numerals are used to denote like elements when convenient, illustrative embodiments of the invention will be described in more detail. Additional layers such as optional adhesives, treating agents, and the like, not necessary in explaining the invention to one skilled in the art, have been omitted from the drawing for the sake of clarity.

Figure 1:
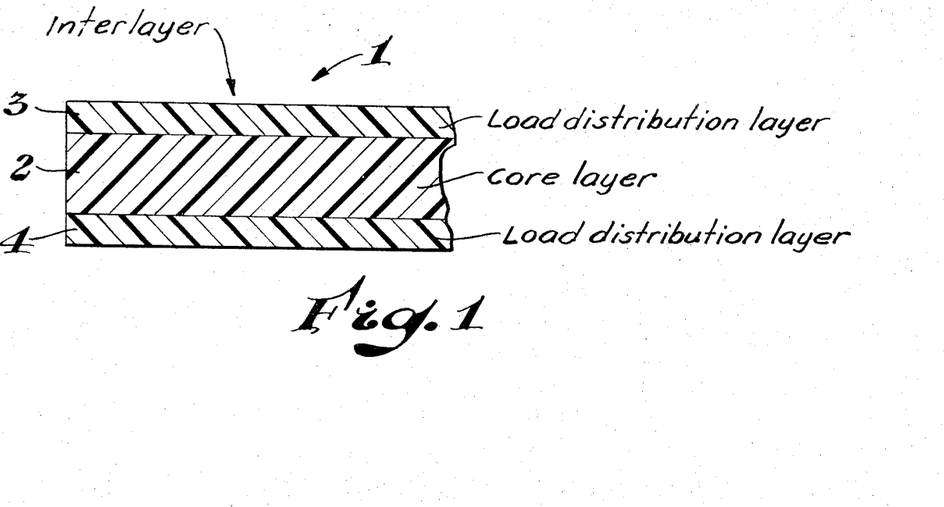
FIG. 1 is a cross-section of an interlayer constructed in accordance with one embodiment of the invention.

In FIG. 1, an interlayer, shown generally by reference numeral 1, for laminated safety glass comprises a core layer 2 and load distributions layers 3 and 4 on either side of and bonded to the core layer. The interlayer can be fabricated by any suitable and convenient technique such as, for example, coextrusion, film lamination, extrusion coating the load distribution layers onto the previously formed core layer, and the like. As will be more fully hereinafter explained, optional adhesives and/or adhesive promoting agents can be disposed between the several layers to achieve the degree of adhesion desired between the several layers.

Figure 2:
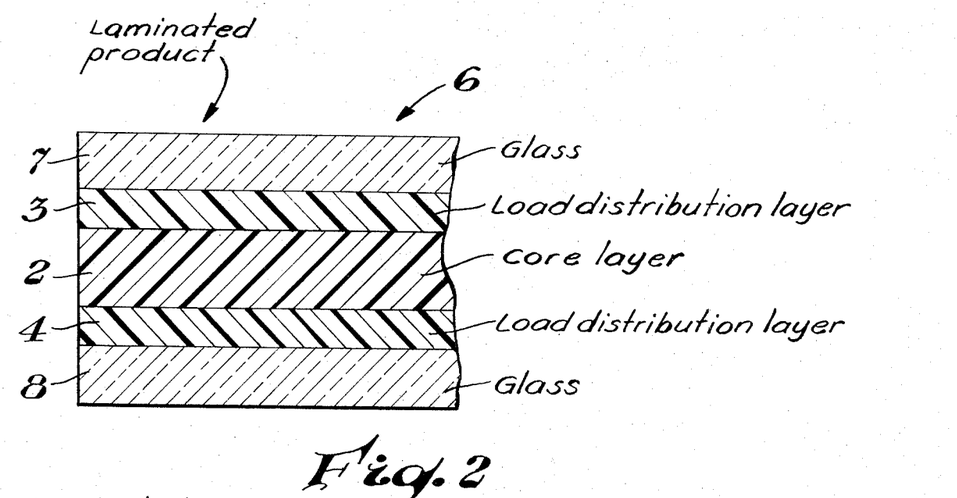
FIG. 2 is a cross-section of a laminated product constructed in accordance with one embodiment of the invention.

In FIG. 2 of the drawing, a laminated product shown generally by reference numeral 6 comprises two layers of glass 7 and 8 disposed on either side of and bonded to an interlayer. The interlayer comprises a core layer 2 and load distribution layers 3 and 4 on either side of the core layer 2 such that the load distribution layers are disposed between the core layer and the glass layers. As indicated with respect to the interlayer described in connection with FIG. 1, the several layers of the laminated product illustrated by FIG. 2 can be bonded together with optional adhesives and/or adhesion promoting agents as desired.

Figure 3:
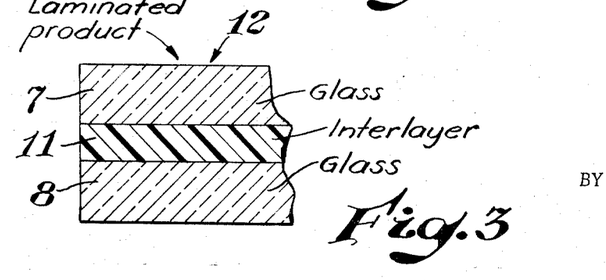
FIG. 3 is a cross-section of a laminated product constructed in accordance with another embodiment of the invention.

In FIG. 3 of the drawing, a laminated product shown generally by reference numeral 12 comprises two layers of glass 7 and 8 disposed on either side of and bonded to an interlayer 11. The interlayer 11 is fabricated of a copolymer of an aliphatic conjugated diolefin and an alkenyl aromatic compound having a tensile strength of at least about 1,300 psi at an elongation of 300 percent. Adhesive and/or adhesion promoting agents can be used in this construction if desired.

The laminated products of the invention can be fabricated by any suitable and convenient technique. They can be prepared by forming a composite of an interlayer and the glass sheets and subsequently applying sufficient heat and pressure to the exposed surface of the glass sheets to effect a bond between the interlayer and the glass sheets. A heated platen press or the like can be employed. An oil autoclave can also be used to produce the laminated product. The laminated product can also be formed by placing the composite in a vacuum bag which can be operated to apply sufficient pressure to achieve the bond desired between the several layers. Roll lamination can also be used to produce the laminated product. It is evident that the foregoing illustrations for producing the laminated products are intended to be exemplary only and should not be construed as limiting of the invention.

As indicated above, the quality of laminated safety glass having ordinary glass layers depends almost exclusively on the physical properties of the interlayer. Thus, in order to have laminated safety glass of good quality, the interlayer must possess good tensile strength, good elongation, good adhesion retention with the glass layers, good tear strength, and good resistance to cut-through by glass splinters. Moreover, in order to have laminated safety glass of improved quality, these physical characteristics of the interlayer must remain satisfactory throughout the environmental temperature range at which the safety glass will be used. The interlayers of the prior art in the form of a single layer or in the form of several distinct layers do not possess the foregoing several physical properties necessary to achieve an improved laminated safety glass, particularly over the temperature range alluded to above.

In that embodiment of the invention wherein the interlayer is composed of several individual layers, the several layers cooperate and function in combination to produce several desirable results. In that embodiment of the invention wherein the interlayer is constructed from a single layer of a copolymer of an aliphatic conjugated diolefin and an alkenyl aromatic compound, the resulting laminated product possesses surprising and unexpected improved physical properties.

As indicated above, in the multilayer interlayer embodiment the core layer can be fabricated of any suitable polymer material having an ultimate tensile strength of at least about 1,000 psi, an ultimate elongation of at least about 25 percent, and, when the ultimate tensile strength is between about 1,000 and about 3,500 psi, the polymer material of the core layer has an ultimate elongation in percent which is at least equal to the value obtained by the expression $$UE_{1000-3500} = 270 - (0.07)(\text{ultimate tensile strength}).$$

The core layer of the interlayer can be fabricated of an ionic copolymer of an $\alpha$-olefin having up to six carbon atoms per molecule and an $\alpha,\beta$-ethylenically unsaturated carboxylic acid having up to eight carbon atoms per molecule wherein at least about 10 percent of the carboxylic acid groups are ionized by neutralization with a salt-forming cation. Exemplary $\alpha$-olefins suitable for use in preparing the ionic copolymer include ethylene, propylene, 1-butene, 1-pentene, methyl-propene, 4-methyl-1-pentene, and the like. Exemplary $\alpha,\beta$-ethylenically unsaturated carboxylic acids suitable for use in preparing the ionic copolymer include acrylic, methacrylic, ethacrylic, crotonic, isocrotonic, tiglic, angelic, senecioic, hexenic, teracrylic, and the like. The ionic copolymers can be of the random variety obtained by copolymerizing a suitable $\alpha$-olefin with a suitable $\alpha,\beta$-ethylenically carboxylic acid or of the graft variety obtained by graft polymerizing the $\alpha,\beta$-ethylenically unsaturated carboxylic acid onto the polyolefin. Salt-forming cations which can be used to neutralize the carboxylic acid groups of the copolymer include organic polyamines such as ethylene diamine, hexamethylene diamine, bis(p-aminocyclo-hexyl) methane, and the like; amines such as piperazine, diethylene triamine, $\beta,\beta'$-diaminodiethyl thioether, and the like; and suitable metals in groups IA, IB, IIA, IIB, IIIA, IIIB, IVA, and VIII identified in the Periodic Table of the Elements published by E. A. Sargent and Co. under catalog No. S–18806. Exemplary monovalent and divalent metal ions which can be used to neutralize the carboxylic acid group include sodium, potassium, lithium, cesium, silver, mercury, copper, beryllium, magnesium, calcium, strontium, barium, cadmium, tin lead, iron, cobalt, nickel, zinc, aluminum, and the like. While the invention is not to be bound by any particular technique for producing the different materials, the ionic copolymers can be prepared by the method described in U.S. Pat. No. 3,338,739, the disclosure of which is specifically incorporated herein by reference. The comonomers in the ionic copolymer can be present in any suitable amount such as, for example, between about 0.5 and about 25 weight percent $\alpha,\beta$-ethylenically unsaturated carboxylic acid and between about 60 and about 99.5 weight percent combined $\alpha$-olefin. The ionic copolymers can also contain other comonomers if desired.

The core of the interlayer can also be fabricated of a copolymer of an aliphatic conjugated diolefin having between four and six carbon atoms per molecule and an alkenyl aromatic compound having up to and including 12 carbon atoms per molecule. Exemplary conjugated diolefins which can be employed include 1,3-butadiene, isoprene, 2,3-dimethyl-1,3-butadiene, 1,3-pentadiene, 3-methyl-1,3-pentadiene, and the like. Exemplary alkenyl aromatic compounds which can be copolymerized with the conjugated diolefin include styrene, $\alpha$-methyl styrene, 4-n-propyl styrene, 1-vinyl naphthalene, 2-vinyl naphthalene, and the like. These copolymers have an ultimate tensile strength of at least about 1,000 psi, an ultimate elongation of at least about 25 percent, and, when the ultimate tensile strength is between about 1,000 and about 3,500 psi, the copolymer has an ultimate elongation in percent which is at least equal to the value obtained by the expression $$UE_{1000-3500} = 270 - (0.07)(\text{ultimate tensile strength}).$$

These polymers can be obtained commercially or they can be prepared by processes well known in the polymerization art. The copolymers can be of the random or block variety with linear or branched chain configuration. The comonomers in the copolymer can be present in any suitable ratio such as, for example, between about 20 and about 60 weight percent aliphatic conjugated diolefin and between about 40 and about 80 weight percent alkenyl aromatic compound.

The core layer of the interlayer can also be fabricated of alkyl ethers of cellulose wherein each alkyl moiety of the ether has up to and including seven carbon atoms per molecule. The core layer can also be fabricated of organic acid esters of cellulose wherein each organic acid moiety of the ester has up to and including seven carbon atoms per molecule. Exemplary alkyl ethers of cellulose which can be employed include methyl cellulose, ethyl cellulose, propyl cellulose, butyl cellulose, pentyl cellulose, isopentyl cellulose, hexyl cellulose, heptyl cellulose, isoheptyl cellulose, and the like. Exemplary organic acid esters of cellulose which can be employed include cellulose acetate, cellulose propionate, cellulose butyrate, cellulose caproate, cellulose caprylate, and the like. The organic acid ester of cellulose can contain two or more different organic acids. Thus, cellulose acetate, butyrate, cellulose acetate propionate, cellulose acetate caprylate, and the like can be used to fabricate the core layer.

The core of the interlayer can also be fabricated of polyurethane. The polyurethane can be obtained commercially or prepared by processes well known in the art from diisocyanates such as 2,4-toluene diisocyanate, 2,6-toluene diisocyanate, diphenyl methane-4,4'-diisocyanate, and the like. The core of the interlayer can also be fabricated of nylon such as, for example, nylon 6, nylon 66, nylon 12, and the like.

The core layer can also be fabricated of polycarbonate. As a general proposition, the polycarbonate resin can be formed from any dihydroxy compound and any carbonate diester. A particularly suitable polycarbonate which can be used is formed from bisphenol A and phosgene.

The core layer of the interlayer can also be fabricated of plasticized poly(vinyl chloride). The normally brittle poly(vinyl chloride) is rendered pliable by means of a suitable plasticizer such as, for example, a non-volatile ester, a low molecular weight resin, or the like. The amount of plasticizer employed will depend upon the type of plasticizer used and the degree of pliability desired. In general, the plasticizer is present in the polymer in an amount between about 20 and about 50 weight percent.

The load distribution layers in the multilayer interlayer and in the resulting laminated product are fabricated of a normally solid, synthetic, organic polymer material having a minimum height to puncture of at least about one inch and a minimum height to tear of at least about 1 and ½ inches as determined by ASTM Designation D2582–67 using a ¼ pound carriage. The polymer material of the load distribution layers must also exhibit certain tear characteristics. When the polymer material of the load distribution layers is subjected to tear propagation by the apparatus and technique set forth in ASTM Designation D1938–67, if the tear propagates by this technique the edges of the resulting tear must be wavy and uneven. Thus, polymer materials which exhibit no tear or which exhibit a wavy and uneven tear are surprisingly effective as load distribution layers. Conversely, polymer materials which exhibit a straight and flat tear are unsatisfactory as load distribution layers.

The load distribution layers can be fabricated of any suitable polymer material which satisfies the foregoing requirements such as an ethylene polymer, a polymer of an aliphatic conjugated diolefin having between four and six carbon atoms, or a copolymer of an aliphatic conjugated diolefin having between four and six carbon atoms and an alkenyl aromatic compound having up to and including 12 carbon atoms. The copolymers of the aliphatic conjugated diolefin and the alkenyl aromatic compound can be random or block with linear and/or branched chain configuration. Exemplary aliphatic conjugated diolefins which can be homopolymerized or copolymerized with the alkenyl aromatic compound include 1,3-butadiene, isoprene, 2,3-dimethyl-1,3-butadiene, 1,3-pentadiene, 3-methyl-1,3-pentadiene, and the like. Exemplary alkenyl aromatic compounds which can be copoymerized with the conjugated diolefin to produce the copolymers include styrene, α-methyl styrene, 4-n propyl styrene, 1-vinyl naphthalene, 2-vinyl naphthalene, and the like. In that embodiment of the invention wherein the load distribution layers are fabricated of a copolymer, the conjugated diolefin is present in the copolymer an amount equal to at least about 10 weight percent and preferably at least about 65 weight percent based upon the total weight of the copolymer. Ethylene polymers which can be employed in fabricating the load distribution layers include polyethylene and copolymers of ethylene with other copolymerizable monomers such as vinyl esters of saturated carboxylic acids, alkyl esters of unsaturated carboxylic acids, and the like. The homopolymers and copolymers suitable for preparing the load distribution layers can be obtained commercially or they can be prepared by polymerization techniques well known in the art.

In that embodiment of the invention wherein the interlayer in the laminated product is in the form of a single layer of a normally solid copolymer of an aliphatic conjugated diolefin and an alkenyl aromatic compound, the copolymer has a tensile strength of at least about 1,300 psi at an elongation of 300 percent. It has been discovered that copolymers of this type which have a tensile strength of less than 1,300 psi at an elongation of 300 percent are not satisfactory in the laminated products constructed in accordance with this embodiment of the invention. In this embodiment of the invention, exemplary aliphatic conjugated diolefin monomers and alkenyl aromatic compounds which can be copolymerized to produce the random or block copolymers with straight or branched chain configuration are the same as those described above in connection with the load distribution layers. In this embodiment, the aliphatic conjugated diolefin is present in the copolymer in an amount between about 20 and about 60 weight percent. The alkenyl aromatic compound is present in the copolymer in an amount between about 40 and about 80 weight percent. These copolymers can be obtained commerically or they can be prepared by techniques well known in the polymerization art.

While the invention is not to be bound by the type of glass used in fabricating the laminated products, since any suitable glass can be employed, exemplary types of glass include float glass, plate glass, chemically tempered glass, thermally tempered glass, and the like.

The interlayers and laminated products of the invention can be of any thickness dependent upon such factors as the strength desired in the product, the intended use for the laminated product, and the like. Thus, except for those materials which are thickness sensitive, when a high strength laminated product is desired the thickness of the interlayer is greater than in a laminated product having lower strength properties. As a general proposition, the interlayer has a thickness of at least about 4 mils and preferably between about 10 and about 200 mils. When the interlayer is in the form of a laminate comprising a core layer and a load distribution layer on either side of the core layer, the core layer has a thickness of at least about 3 mils and preferably between about 6 and about 120 mils and each of the load distribution layers has a thickness of at least about 0.5 mil and preferably between about 2 and about 40 mils. When the interlayer is a single layer, in accordance with that embodiment of the invention, the single layer has a thickness of at least about 4 mils and preferably between about 10 and about 200 mils. The thickness of each of the glass layers in the laminated product is in general at least about 30 mils and preferably between about 60 and about 300 mils. It is evident that the foregoing ranges are illustrative only and that thicknesses outside of these ranges can be employed without departing from the spirit and scope of the invention. It is further evident that the polymer layers such as the core layers and/or the load distribution layers can be assembled from or comprise a multitude of layers if desired.

It is generally preferred to employ an adhesive between each of the load distribution layers and the corresponding glass layers in the laminated products of the invention. The adhesive can be selected to provide the degree of bond desired between the load distribution layers and the glass layers. As indicated above, the physical properties of the laminated product such as impact strength is dependent at least in part upon the degree of bond between the glass layers and the interlayer. The use of an adhesive thus provides a convenient way for achieving the physical properties desired. Epoxy organo silane coupling agents which are compatible with the adhesive can be employed as an aid in further controlling the bond between the glass layers and the interlayer in the laminated product. U.S. Pat. Nos. 2,946,701 and 3,317,369 disclose coupling agents which are illustrative of those which can be employed in the practice of the invention. Exemplary epoxy organo silane coupling agents which can be employed include 3-(tri-methoxy silyl) propyl glycidal ether, 2-(trimethoxy silyl) ethyl glycidyl ether, 4-(trimethoxy silyl) butyl glycidyl ether and the like. The amount of epoxy organo silane coupling agent employed in the adhesive is dictated primarily by the degree of bond desired. In general, concentrations of between about 0.1 and about 2 weight percent coupling agent based upon the total weight of the adhesive system can be used.

Adhesives which can be employed for bonding the load distribution layers to the glass layers include copolymers of an α-olefin having up to and including six carbon atoms per molecule and an α,β-ethylenically unsaturated carboxylic acid having up to and including eight carbon atoms per molecule. The adhesive copolymer can also contain a third comonomer such as an alkyl ester of an α,β-ethylenically unsaturated carboxylic acid having up to and including eight carbon atoms per molecule wherein the alkyl moiety of the ester contains up to and inlcuding eight carbon atoms. Vinyl esters of a saturated carboxylic acid having up to and including eight carbon atoms per molecule can also be employed as a comonomer in the adhesive copolymers. An ionic copolymer, such as described above in connection with the core layer, can also be employed as an adhesive if desired. Exemplary α-olefins in the adhesive include ethylene, propylene, 1-butene, 1-pentene, methyl propene, 4-methyl-1-pentene, and the like. Exemplary α,β-ethylenically unsaturated carboxylic acids in the adhesives include acrylic, methacrylic, ethacrylic, crotonic isocrotonic, tiglic, angelic, senecioic, hexenic, teracrylic, and the like. Exemplary alkyl esters which can be present in the adhesive include methyl methacrylate, ethyl methacrylate, methyl angelate, ethyl senecioate, and the like. Exemplary vinyl esters which can be present in the adhesives include vinyl acetate, vinyl propionate, vinyl butyrate, vinyl caprylate and the like.

While the comonomers in the adhesives can be present in any suitable ratio, as a general proposition the adhesives contain between about 0.5 and about 25 weight percent α,β-ethylenically unsaturated carboxylic acid, between about 60 and about 99.5 weight percent α-olefin, and up to about 39.5 weight percent ester of an acid. The adhesives can be of the random copolymer variety or of the graft copolymer variety.

The laminated products of this invention have utility in a variety of fields such as land, air, and water vehicles including automobiles, trucks, buses, airplanes, submarines, space vehicles, and the like; industrial buildings including factories, warehouses, manufacturing plants, and the like; commercial build-ings including retail stores, high-rise apartments, theaters, sports event stadiums, and the like; and residence type buildings including houses, out buildings, and the like. The laminated products can be planar or they can be curved in one or more directions as desired.

The following examples are illustrative of the improvements in laminated products constructed according to the teachings of the invention. It must be understood that these examples are for the purpose of illustration only and should not be construed as limiting of the invention.

EXAMPLES 1 through 9

Several laminated products of the invention were prepared and tested for impact strength and the results compared with the impact strength of other laminated products prepared by the same technique. The laminqted products were each 12 inches square and comprised two layers of sheets of float glass each 120 mils thick and a normally solid, organic polymer interlayer disposed between and bonded to the glass layers. Each of the laminated products were prepared by disposing the preformed interlayer between the glass sheets and subsequently placing the resulting composite into a rubber bag equipped with means for withdrawing air from the bag. The rubber bag containing the composite was placed under Calrod heaters and the air withdrawn from the bag. The composite was heated at a temperature of about 275° F. for about 1 hour. At the end of this period, the resulting laminated product was removed, conditioned by heating or cooling as necessary to achieve the desired test temperature, and tested for impact strength by means of the equipment described in Section 5.12 of the American Standards Association Code Z 26.1 — 1966 entitled "American Standard Safety Code for Safety Glazing Materials for Glazing Motor Vehicles Operating on Land Highways" except that a 5 pound sphere was employed instead of a ½ pound sphere as specified in Section 5.12. As indicated in Table I below, the laminated products were impacted with the 5 pound sphere from heights of 12 and 19 feet at temperatures of 0° F, 73° F, and 120° F. In the runs wherein a block copolymer load distribution layer was present, a 0.7 mil thick coating of ionic copolymer of about 90 weight percent ethylene and 10 weight percent methacrylic acid having about 50 percent neutralization with sodium was disposed on either side of the load distribution layer to serve as an adhesive.

TABLE I

| Example | Interlayer structure | | | Impact results at indicated temperature with 5 lb. sphere from 19 ft. unless otherwise indicated | | |
|---|---|---|---|---|---|---|
| | Load distribution layer (mils) | Core layer (mils) | Load distribution layer (mils) | 0° F. | 73° F. | 120° F. |
| Control 1 | None | 30 PVB [1] | None | P (12') | F | P (12') |
| Control 2 | do | 30 IC [2] | do | P (12') | P (12') | |
| Control 3 | do | 40 IC | do | P | F | P |
| Control 4 | 2 IC | 30 E [3] | 2 IC | | P (12') | |
| Control 5 | 11 IC | 12 E | 11 IC | | P (12') | |
| 1 | 1.8 E | 28 IC | 1.8 E | NF | NF | NF |
| 2 | 4 E | 32 IC | 4 E | NF | NF | NF |
| 3 | 6 E | 27 IC | 6 E | NF | NF | NF |
| 4 | 4 E | 27 IC | 4 E | NF | NF | NF |
| 5 | 1 E | 31.5 IC | 1 E | NF | NF | F |
| 6 | 1 E | 26 IC | 1 E | NF | F | P |
| 7 | 4 E | 22 IC | 4 E | NF | F | P |
| Control 6 [4] | 3.5 E | 30 IC | None | | P | |

TABLE I—Continued

| Example | Interlayer structure | | | Impact results at indicated temperature with 5 lb. sphere from 19 ft. unless otherwise indicated | | |
|---|---|---|---|---|---|---|
| | Load distribution layer (mils) | Core layer (mils) | Load distribution layer (mils) | 0° F. | 73° F. | 120° F. |
| 8 | 3.5 E | 30 IC | 1 E | | | NF |
| Control 7 [5] | None | 30 IC | 3.5 E | | P | |
| 9 | 1 E | 30 IC | 3.5 E | | | NF |

[1] PVB means poly(vinyl butyral).
[2] IC means an ionic copolymer of about 10 weight percent methacrylic acid and about 90 weight percent ethylene having about 50 percent neutralization with sodium.
[3] E means a block copolymer of styrene and butadiene containing about 70 weight percent butadiene and having a minimum height to puncture greater than one inch and a minimum height to tear greater than one and one-half inches.
[4] Impacted with the block copolymer layer on top of the core layer.
[5] Impacted with the block copolymer layer under the core layer.

NOTE.—P means that the sphere penetrated and passed completely through the laminated product. F means that the interlayer tore or fractured. NF means that the interlayer did not fracture or tear.

As noted by the data reported in Table I, the laminated products of this invention have improved impact resistance over the temperature range of 0° to 120° F. In Control 1, a laminated product having a single interlayer of poly(vinyl butyral) was completely penetrated by the sphere when impacted at temperatures of 0° F and 120° F from a height of only 12 feet. In Controls 2 and 3, having 30-mil and 40-mil thick interlayers of ionic copolymer, respectively, the sphere also penetrated the laminated products at impact temperatures of 0° F and 120° F. Although the sphere did not penetrate the laminated products, in Controls 1 and 3 at a test temperature of 73° F, the sphere did fracture the interlayer and if such a laminated product were used in an automobile, for example, it could produce serious cosmetic injuries to the occupants. In Control 2, the laminated product containing a 30-mil thick interlayer of ionic copolymer was completely penetrated by the sphere at a test temperature of 73° F. In Control 4, the laminated product having a 30-mil thick interlayer of block copolymer and a total of 4 mils ionic copolymer was penetrated at 73° F from a height of 12 feet thus indicating that this particular combination of materials is unsatisfactory as the interlayer. In Control 5, the laminated product, having a core layer of 12 mils block copolymer and a total of 22 mils ionic copolymer, was also penetrated by the sphere at 73° F from a height of 12 feet. In Examples 1 through 7, which represent tests of laminated products constructed in accordance with the invention, the interlayer comprised a core layer of ionic copolymer in varying thicknesses and load distribution layers of a block copolymer also in varying thicknesses. On the basis of these runs, it can be seen that the laminated products embodying the concept of this invention are far superior to the laminated products tested in Controls 1 through 5. It should be noted that in most instances, the interlayer was not even fractured at 0° F, 73° F, or 120° F when impacted from a height of 19 feet. This is particularly suprising in view of the fact that the total thickness of the interlayer in Examples 1 through 7 is approximately the same as the thickness of the interlayers in Controls 4 and 5.

In Controls 6 and 7, laminated products having interlayers with only one load distribution layer were impacted with the result that the sphere penetrated the laminated products at 73° F. In Examples 8 and 9, which involved testing the same type of laminated products as in Controls 6 and 7 except that a second load distribution layer in the form of a 1-mil thick block copolymer layer was positioned between the ionic copolymer surface and the glass layer, the sphere did not even fracture the interlayer.

EXAMPLES 10 through 13

In order to further demonstrate the contribution of the block copolymer load distribution layers in the laminated products of the invention, several laminates were prepared and tested by the techniques described in Examples 1 through 9. In these runs, the interlayers of the laminated products were in the form of single layers of various materials and in the form of laminates with a core layer of the same material and a load distribution layer of a block polymer on either side of the core layer. The various interlayers tested and the results obtained are reported in Table II below. In these runs, the load distribution layers existed as a layer in a laminate comprising 0.7 mil ionic copolymer/2 mils block copolymer/0.7 mil ionic copolymer. The ionic copolymer and block copolymer were of the same type as described in connection with Examples 1 through 9. The 0.7-mil thick ionic copolymer layer between the block copolymer layers and the glass layers serves as an adhesive in the laminated product.

TABLE II

| Example | Interlayer | | Impact strength with 5 lb. sphere from 19 ft. at indicated temperature | | | |
|---|---|---|---|---|---|---|
| | Core layer (mils) | Load distribution layers | 0° F. | 73° F. | 100° F. | 120° F. |
| Control 1 | 30 IC [1] | None | P | P | P | P |
| 10 | 28 IC | Yes | NP | NP | NP | NP |
| Control 2 | 30 PVB [2] | None | P | NP | | P |
| Control 3 | 30 PVB | Yes | P | NP | | P |
| Control 4 | 45 Polyurethane | None | P | P | | P |
| 11 | 35 Polyurethane | Yes | NP | NP | NP | P |
| Control 5 | 38 PVC [3] | Yes | | P | | P |
| Control 6 | 45 Plasticized PVC | None | P | P | | P |
| 12 | 35 Plasticized PVC | Yes | NP | NP | | NP |
| Control 7 | 45 Nylon 12 | None | | P | | NP |
| 13 | 35 Nylon 12 | Yes | P | NP | | NP |
| Control 8 | 32 Low density polyethylene | Yes | P | P | | P |
| Control 9 | 40 Polypropylene | Yes | | P | | P |

TABLE II—Continued

| Example | Interlayer | | Impact strength with 5 lb. sphere from 19 ft. at indicated temperature | | | |
|---|---|---|---|---|---|---|
| | Core layer (mils) | Load distribution layers | 0° F. | 73° F. | 100° F. | 120° F. |
| Control 10 | 43 Polystyrene | Yes | P | | P | |
| Control 11 | 43 Styrene/acrylonitrile copolymer | Yes | P | | P | |

[1] IC means ionic copolymer as described in Examples 1 through 9.
[2] PVB means poly(vinyl butyral).
[3] PVC means poly(vinyl chloride).

NOTE.—P means the sphere penetrated and passed completely through the laminated product. NP means the sphere did not penetrate the laminated product.

As evidenced by the data reported in Table II, improved laminated products results when the interlayer is composed of block copolymer load distribution layers and a core layer of an ionic copolymer (Control 1 and Example 10), polyurethane (Control 4 and Example 11), plasticized poly(vinyl chloride) (Control 6 and Example 12), and nylon (Control 7 and Example 13). In Examples 10 through 13, laminated products having the 2-mil thick load distribution layers fabricated of the block copolymer of styrene and butadiene between the core layer and the glass layers exhibit a substantial improvement in impact strength as compared to laminated products constructed with the same core layer but without the load distribution layers even though the total interlayer thickness is less. While the load distribution layers cooperate with core layers fabricated of this particular family of polymers, as evidenced by Controls 8 through 11 the load distribution layers do not appreciably improve the impact strength of laminated products with core layers fabricated of low density polyethylene, polypropylene, polystyrene, or styrene/acrylonitrile copolymer because these core materials have either insufficient ultimate tensile strength and/or insufficient ultimate elongation.

EXAMPLES 14 and 15

In another series of runs, to illustrate improved laminated products with interlayers fabricated of block copolymer load distribution layers and core layers fabricated of other polymer materials, several laminated products were prepared and tested by the technique described in Examples 1 through 9. The materials employed and the results obtained by testing the laminated products are reported in Table III below.

results in a laminated product which is surprisingly more resistant to impact than is a laminated product fabricated with an interlayer of cellulose acetate butyrate alone (Controls 2 and 3) or a laminated product fabricated with an interlayer of cellulose acetate butyrate and ionic copolymer layers (Control 1). Similarly, a laminated product employing an interlayer of ethyl cellulose and block copolymer load distribution layers is surprisingly more resistant to impact (Example 15) than are laminated products with an interlayer of ethyl cellulose and ionic copolymer layers (Control 4) and laminated products constructed with an interlayer of ethyl cellulose and ethylene/acrylic acid/isobutyl acrylate copolymer layers (Control 5).

EXAMPLE 16

In another run, a laminated product in accordance with the invention was constructed and tested by the technique described in Examples 1 through 9. The laminated product had an interlayer comprising 2 mils ionic copolymer/9.7 mils block copolymer load distribution layer/19 mils ionic copolymer core layer/9.7 mils block copolymer load distribution layer/2 mils ionic copolymer. The ionic copolymer layers and the block copolymer of the load distribution layers were the same type of polymer as those employed and described in Examples 1 through 9. The results of the test conducted on this laminated product are reported in Table IV below.

TABLE IV

Impact Strength With 5 lb. Sphere From 19 Ft. Unless Otherwise Indicated at Indicated Temperature

TABLE III

| Example | Load distribution layer (mils) | Core layer (mils) | Load distribution layer (mils) | Impact results at indicated temperature with 5 lb. sphere from 19 ft. unless otherwise indicated | | |
|---|---|---|---|---|---|---|
| | | | | 0° F. | 73° F. | 120° F. |
| Control 1 | 17 IC[2] | 80 CAB[1] | 17 IC | P (12') | | |
| Control 2[3] | None | 40 CAB | None | P | P | P |
| Control 3[3] | do | 30 CAB | do | P | P | |
| 14 | 2 E[4] | 30 CAB | 2 E[4] | | NP | NP |
| Control 4 | 20 IC | 80 EC[5] | 20 IC | P | | |
| Control 5 | 25 E/AA/IBA[6] | 75 EC | 25 E/AA/IBA | P (12') | | |
| 15 | 2 E[4] | 30 EC | 2 E[4] | | NP | NP |

[1] CAB means cellulose acetate butyrate.
[2] IC means ionic copolymer as described in Examples 1 through 9.
[3] CAB was bonded to the glass by means of eopxy adhesive.
[4] Block copolymer/ionic copolymer laminate the same as described in Examples 10 through 13.
[5] EC means ethyl cellulose.
[6] Means a terpolymer containing 68 weight percent ethylene, 20 weight percent acrylic acid, and 12 weight percent isobutyl acrylate.

NOTE.—P means that the sphere penetrated and passed completely through the laminated product. NP means the sphere did not penetrate.

As evidenced by the data in Table III, the block copolymer load distribution layers in combination with a core layer of cellulose acetate butyrate (Example 14)

| Example | 0° F | 73° F | 120° F |
|---|---|---|---|
| 16 | NP | NP | NP (15') |

Note to Table IV
NP — means the sphere did not penetrate the laminated product.

EXAMPLE 17

In another run to demonstrate the feasibility of constructing a laminated product with an interlayer having a core in the form of a laminate, an interlayer comprising 1 mil block copolymer load distribution layer/15.7 mils ionic copolymer/1 mil block copolymer/15.7 mils ionic copolymer/1 mil block copolymer load distribution layer was disposed between two sheets of glass and a laminated product prepared and tested by the technique described in Examples 1 through 9. The ionic copolymer and block copolymer were the same type as those described in Examples 1 through 9. A 0.7-mil thick ionic copolymer adhesive was disposed between each of the load distribution layers and the glass layers. Upon testing the laminated product for impact strength, it was determined that the interlayer did not fracture (NF) when impacted with the 5 lb. sphere from a height of 19 feet at impacting temperatures of 0° F, 73° F, and 120° F. These data show that the core layer can be separated by another layer if desired.

EXAMPLES 18 through 20

Several laminated products were prepared with interlayers having core layers of various styrene-butadiene block copolymers and block copolymer load distribution layers. The technique for preparing and testing the laminated products was the same as that described in connection with Examples 1 through 9. In these laminated products, the load distribution layers had a 0.7 mil thick layer of ionic copolymer adhesive on either side in the same manner as described in connection with Examples 10 through 13. The results of these runs are reported in Table V.

TABLE V

| | Interlayer | | Impact strength with 5 lb. sphere from 19 ft. at indicated temperature | | | |
|---|---|---|---|---|---|---|
| Example | Core layer (mils) | Load distribution layers | 0° F. | 73° F. | 100° F. | 120° F. |
| Control 1 | 40 SB [1] | None | P | P | | P |
| 18 | 35 SB [1] | Yes | NP | NP | NP | P |
| Control 2 | 45 SB [2] | None | P | P | | P |
| 19 | 40 SB [2] | Yes | NP | NP | | P |
| Control 3 | 45 SB [3] | None | P | P | | P |
| 20 | 40 SB [3] | Yes | NP | NP | NP | P |
| Control 4 | 35 SB [4] | Yes | P | P | | P |
| Control 5 | 40 SB [5] | Yes | P | P | | P |
| Control 6 | 40 SB [6] | Yes | P | P | | P |
| Control 7 | 30 SB [7] | Yes | | P | | |
| Control 8 | 30 SB [8] | Yes | | P | | |
| Control 9 | 40 SB [9] | None | | P | | |
| Control 10 | 30 SB [9] | Yes | | P | | |
| Control 11 | 35 SB [9] | None | | P | | |
| Control 12 | 30 SB [9] | Yes | | P | | |
| Control 13 | 35 SB [9] | None | P | P | | P |
| Control 14 | 30 SB [9] | Yes | P | P | P | P |

[1] Block copolymer of styrene and butadiene containing 50 weight percent styrene and having a tensile strength of about 1,450 p.s.i. at an elongation of 900 percent.
[2] Block copolymer of styrene and butadiene containing 60 weight percent styrene and having an ultimate tensile strength greater than 1,400 p.s.i. and an ultimate elongation greater than 250 percent.
[3] Block copolymer of styrene and butadiene containing 70 weight percent styrene and having an ultimate tensile strength of 3,100 p.s.i. and an ultimate elongation of 350 percent.
[4] Block copolymer of styrene and butadiene containing 75 weight percent styrene and having an ultimate elongation less than 25 percent.
[5] Block copolymer of styrene and butadiene containing 55 weight percent styrene and having an ultimate tensile strength less than 1,000 p.s.i.
[6] Block copolymer of styrene and butadiene containing 50 weight percent styrene and having an ultimate tensile strength less than 1,000 p.s.i.
[7] Block copolymer of styrene and butadiene containing 40 weight percent styrene and having an ultimate tensile strength less than 1,000 p.s.i.
[8] Block copolymer of styrene and butadiene containing 35 weight percent styrene and having an ultimate tensile strength less than 1,000 p.s.i.
[9] Block copolymer of styrene and butadiene containing 30 weight percent styrene and having an ultimate tensile strength less than 1,000 p.s.i.

NOTE.—P means the sphere penetrated and passed completely through the laminated product. NP means the sphere did not penetrate the laminated product.

As noted by the data reported in Table V, laminated products wherein the core layer of the interlayer is a block copolymer of styrene and butadiene having a tensile strength of about 1,450 psi at an elongation of 900 percent exhibit improved impact resistance in combination with the load distribution layers (Control 1 and Example 18) as compared to laminated products constructed with in interlayer having a core layer with an ultimate tensile strength of less than 1,000 psi (Controls 5, 6, 7, 8, and 10). As evidenced by Controls 1 and 6 and Example 18, the load distribution layers did not improve the impact strength of the core layer in Control 6 to the same degree as the core layer in Example 18. Control 4 shows that when the core layer has an ultimate elongation less than 25 percent, the load distribution layers do not function to improve the resulting interlayer as the core layers in Examples 18 through 20 having higher ultimate elongations. Controls 5 through 9 show that interlayers having core layers constructed with block copolymers having comparatively low styrene contents and ultimate tensile strengths of less than 1,000 psi are unsatisfactory in terms of impact strength when impacted with the 5 pound sphere from a height of 19 feet.

EXAMPLES 21 and 22

In another series of runs to illustrate the improved results obtained with a laminated product having an interlayer in the form of a single layer of a block copolymer of an aliphatic conjugated diolefin and an alkenyl aromatic compound characterized by an ultimate tensile strength of at least about 1,300 psi at an elongation of 300 percent in accordance with that embodiment of the invention, several laminated products were prepared by the technique described in Examples 1 through 9 with various block copolymer interlayers. The resulting laminated products were tested by the technique described in Examples 1 through 9. The laminated products constructed and the test results obtained are reported in Table VI.

As indicated by Controls 1 through 3, the laminated products fabricated with the several indicated styrene-butadiene block copolymers having tensile strengths less than 1,300 psi at an elongation of 300 percent exhibited very poor impact strength. In Example 21, the laminated product having the interlayer of styrene-butadiene copolymer with a tensile strength of 1,500 psi at an elongation of 300 percent exhibits very good impact strength. Example 22 illustrates that block copolymer load distribution layers can be employed with the styrene-butadiene copolymer of Example 21 if desired.

EXAMPLES 23 THROUGH 25

In order to demonstrate the utility of load distribution layers fabricated of various ethylene polymers, in accordance with that embodiment of the invention, several laminated products were prepared and tested by the technique described in Examples 1 through 9. The results of the tests are reported in Table VII below. As indicated in Table VII, ethylene polymers employed in constructing the load distribution layers included low density polyethylene, a copolymer of ethylene and vinyl acetate, and a copolymer of ethylene and acrylic acid. In Control 3 and Example 23 of Table VII, a 0.7-mil thick layer of ionic copolymer was employed as an adhesive between the interlayer and the glass layers.

TABLE VI

| Example | Interlayer structure | | | Impact results at indicated temperature with 5 lb. sphere from 19 ft. unless otherwise indicated | | |
|---|---|---|---|---|---|---|
| | Load distribution layer (mils) | Core layer (mils) | Load distribution layer (mils) | 0° F. | 73° F. | 120° F. |
| Control 1 | None | 40 SB [1] | None | P | P | P |
| Control 2 | do | 35 SB [2] | do | P | P | P |
| Control 3 | do | 45 SB [3] | do | P | P | P |
| 21 | do | 38 SB [4] | do | NP | NP | NP (15') |
| 22 | 2 E [5] | 45 SB [4] | 2 E [5] | NP | NP | NP |

[1] Block copolymer of styrene and butadiene containing about 50 weight percent styrene and having a tensile strength of about 1,100 p.s.i. at an elongation of 300 percent.
[2] Block copolymer of styrene and butadiene containing about 50 weight percent styrene and having a tensile strength of about 600 p.s.i. at an elongation of 300 percent.
[3] Block copolymer of styrene and butadiene containing about 60 weight percent styrene and having a tensile strength of less than 1,300 at an elongation of 300 percent.
[4] Block copolymer of styrene and butadiene containing about 60 weight percent styrene and having a tensile strength of about 1,500 p.s.i. at an elongation of 300 percent.
[5] Laminate of two mils block copolymer of about 70 weight percent butadiene and about 30 weight percent styrene with 0.7 mil layers of ionic copolymer adhesive (as described in Examples 10–13) on either side.

NOTE.—P means that the sphere penetrated and passed completely through the laminated product. NP means that the sphere did not penetrate the laminated product.

TABLE VII

| Example | Interlayer | | | Impact results at indicated temperature with 5 lb. sphere from 19 ft. | | |
|---|---|---|---|---|---|---|
| | Load distribution Layer (mils) | Core layer (mils) | Load distribution layer (mils) | 0° F. | 73° F. | 120° F. |
| Control 1 | None | 30 IC [1] | None | P | P | P |
| Control 2 | do | 40 IC | do | P | F | P |
| Control 3 | 3 PVB [2] | 30 IC | 3 PVB | P | P | P |
| 23 | 4 PE [3] | 30 IC | 4 PE | F | NF | |
| 24 | 2 EVA [4] | 30 IC | 2 EVA | NP | NP | P |
| 25 | 2 EAA [5] | 30 IC | 2 EAA | NP | NP | P |

[1] IC means an ionic copolymer of about 10 weight percent methacrylic acid and about 90 weight percent ethylene having about 50 percent neutralization with sodium.
[2] PVB means poly(vinyl butyral).
[3] PE means low density polyethylene.
[4] EVA means copolymer containing 28 weight percent vinyl acetate and 72 weight percent ethylene.
[5] EAA means copolymer containing 8 weight percent acrylic acid and 92 weight percent ethylene.

NOTE.—P means the sphere penetrated and passed completely through the laminated product. NP means the sphere did not penetrate the laminated product. F means the interlayer tore or fractured. NF means the interlayer did not tear or fracture.

As indicated by the data reported in Table VII, load distribution layers fabricated of low density polyethylene (Example 23), ethylene/vinyl acetate copolymer (Example 24), and ethylene/acrylic acid copolymer (Example 25) resulted in improved laminated products as compared to the results obtained in Controls 1 and 2 which were fabricated with interlayers of the same ionic copolymer and to the results obtained in Control 3 which was fabricated with a core of the same ionic copolymer and 3-mil thick layers of poly(vinyl butyral) between the core layer and the glass layers. The laminated products illustrated by Examples 23 through 25 have surprisingly better impact resistance than the laminated product of Control 2 in spite of the fact that the total interlayer thickness was less than the thickness of the interlayer in the laminated product of Control 2.

EXAMPLES 26 through 29

Several laminated products were prepared by the technique described in Examples 1 through 9 with load distribution layers fabricated of block copolymers having different concentrations of aliphatic conjugated diolefins and different concentrations of alkenyl aromatic compounds. The resulting laminated products were tested for impact strength by the same technique as described in Examples 1 through 9. In these runs, the core layer of the interlayer was a 30-mil thick layer of ionic copolymer of ethylene and methacrylic acid containing about 10 weight percent methacrylic acid and having about 50 percent of the acid groups neutralized with sodium. The load distribution layers were each about 2 mils thick and were fabricated of block copolymers of styrene and butadiene in various proportions. The load distribution layers were positioned between and bonded to the interlayer and the glass layers by means of 0.7-mil thick films of ionic copolymer adhesive. Table VIII below shows the impact results obtained with load distribution layers fabricated of the various block copolymers.

TABLE VIII

| Example | Load Distribution Layers (weight percent comonomers) | Impact results with 5 lb. sphere from 19 ft. at indicated temp. | | |
|---|---|---|---|---|
| | | 0°F | 73°F | 120°F |
| 26 | 70 Butadiene 30 Styrene | NP | NP | NP |
| 27 | 50 Butadiene 50 Styrene | NP | NP | NP |
| 28 | 30 Butadiene 70 Styrene | NP | NP | NP |
| 29 | 15 Butadiene 85 Styrene | NP | NP | NP |

Note to Table VIII
NP — means the sphere did not penetrate the laminated product.

As indicated by the data reported in Table VIII, the laminated products of the invention can have load distribution layers fabricated of aliphatic conjugated diolefins and alkenyl aromatic compounds in various proportions.

EXAMPLE 30

Several 12 inch square laminated products were prepared by depositing a random copolymer of styrene and butadiene on one surface of each of several sheets of float glass. The random copolymer was deposited from solution in toluene to provide a layer on the glass surface about 3 mils thick. The random copolymer contained about 25 weight percent styrene and about 75 weight percent butadiene. A composite was then formed by disposing a sheet of ionic copolymer about 30 mils thick between two of the sheets of glass with the random copolymer layers in contact with the ionic copolymer sheet. The ionic copolymer was a random copolymer of about 90 weight percent ethylene and about 10 weight percent methacrylic acid having about 50 percent of the acid groups neutralized with sodium. The composite was then placed in a rubber vacuum bag and the laminated product produced by the technique described in Examples 1 through 9. The laminated products were then conditioned for temperature and tested for impact strength by the technique described in those examples. In these tests, the 5 pound sphere did not fracture the interlayer when impacted from 19 feet at impacting temperatures of 0° F, 73° F, and 120° F. On the basis of these runs, it is evident that the interlayer fabricated of an ionic copolymer core and random copolymer load distribution layers resulted in laminated products having very good strength properties.

EXAMPLE 31

Several 12 inch square laminated products were prepared with polycarbonate interlayer between two sheets of glass. The laminates were prepared by depositing a 2-mil thick layer of a random copolymer of 75 weight percent butadiene and 25 weight percent styrene from a toluene solution on one surface of each of the glass sheets. Composites were then formed by disposing a 20-mil thick layer of polycarbonate between the glass sheets in register with the random copolymer-coated surfaces. The composites were then laminated in a rubber vacuum bag by the technique described in Examples 1 through 9. The resulting laminated products were conditioned for temperature and impacted with the 5 pound sphere at test temperatures of 0° F, 73° F, and 120° F. At all three test temperatures, the interlayer including the polycarbonate core and the random copolymer load distribution layers was not fractured. In control runs, a 28-mil thick layer of the same type polycarbonate was disposed between the same type of glass and bonded to the glass surfaces by means of an epoxy adhesive. The random copolymer was omitted in preparing these laminated products. When the laminated products without the load distribution layer were tested for impact strength, the 5 pound sphere penetrated the laminates at test temperatures of 0° F, 73° F, and 120° F.

Although the invention has been described in considerable detail, it must be understood that such description is for the purpose of illustration only. Many varaiations and modifications can be made from such description without departing from the spirit and scope of the invention.

What is claimed is:

1. A safety glass interlayer in the form of a laminate comprising, in combination, a core layer of a normally solid, synthetic, thermoplastic polymer material selected from the group consisting of an ionic copolymer of an α-olefin having up to and including six carbon atoms per molecule and an α,β-ethylenically unsaturated carboxylic acid selected from the group consisting of monocarboxylic acids and dicarboxylic acids each having up to and including eight carbon atoms per molecule, said ionic copolymer having at least about 10 percent of the carboxylic groups ionized by neutralization with a salt-forming cation; a copolymer of an aliphatic conjugated diolefin having between four and six carbon atoms per molecule and an alkenyl aromatic compound having up to and including 12 carbon atoms per molecule; alkyl ethers of cellulose wherein each alkyl group of said ether contains up to and including seven carbon atoms per molecule; organic acid esters of cellulose wherein each organic acid group of said ester contains up to and including seven carbon atoms per molecule; polyurethane; nylon; polycarbonate; and plasticized poly(vinyl chloride); said core layer having an ultimate tensile strength of at least about 1,000 psi, an ultimate elongation of at least about 25 percent, the ultimate tensile strength and the ultimate elongation as determined by ASTM Designation D638-68 at a rate of 5,000 inches per minute, and, when the ultimate tensile strength is between about 1,000 and about 3,500 psi, said core layer has an ultimate elongation in percent which is at least equal to the value obtained by the expression $$UE_{1000-3500} = 270 - (0.07)(\text{ultimate tensile strength});$$

and a load distribution layer on either side of and bonded to said core layer, said load distribution layer being fabricated of a normally solid, synthetic, thermoplastic polymer material selected from the group consisting of an ethylene polymer, a polymer of an aliphatic conjugated diolefin having between four and six carbon atoms per molecule, and a copolymer of an aliphatic conjugated diolefin having between four and six carbon atoms per molecule and an alkenyl aromatic compound having up to and including 12 carbon atoms per molecule, said load distribution layer having a minimum height to puncture of at least about 1 inch and a minimum height to tear of at least about 1 and ½ inches as determined by ASTM Designation D2582-67 using a ¼ pound carriage and when said load distribution layer is torn by being subjected to the tear propagation procedure set forth in ASTM Designation D1938-67, the resulting edges of the tear are wavy and uneven.

2. A safety glass interlayer according to claim 1 wherein said core layer has a thickness of between about 4 and about 200 mils and each of said load distribution layers has a thickness of between about 0.5 and about 40 mils.

3. A safety glass interlayer according to calim 1 wherein said copolymer in said core layer has between about 20 and about 60 weight percent aliphatic conjugated diolefin and between about 40 and about 80 weight percent alkenyl aromatic compound and wherein said copolymer in said load distribution layer has at least about 10 weight percent conjugated diolefin based upon the total weight of said copolymer in said load distribution layer.

4. A safety glass interlayer according to claim 1 wherein said copolymer in said load distribution layer is a block copolymer.

5. A safety glass interlayer in the form of a laminate comprising, in combination, a core layer of a normally solid, synthetic, organic polymer material having an ultimate tensile strength of at least about 1,000 psi, an ultimate elongation of at least about 25 percent, the ultimate tensile strength and the ultimate elongation as determined by ASTM Designation D638-68 at a rate of 5,000 inches per minute, and, when the ultimate tensile strength is between about 1,000 and about 3,500 psi, the polymer material of the core layer has an ultimate elongation in percent which is at least equal to the value obtained by the expression $$UE_{1000-3500} = 270 - (0.07)(\text{ultimate tensile strength})$$

and a load distribution layer on either side of and bonded to said core layer, said load distribution layer being fabricated of a normally solid, synthetic, organic polymer material having a minimum height to puncture of at least about 1 inch and a minimum height to tear of at least about 1 and ½ inches as determined by ASTM Designation D2582-67 using a ¼ pound carriage and when the polymer material of said load distribution layer is torn by being subjected to the tear propagation procedure set forth in ASTM Designation D1938-67, the resulting edges of the tear are wavy and uneven.

6. A safety glass interlayer according to claim 5 wherein said core layer has a thickness of between about 4 and about 200 mils and each of said load distribution layers has a thickness of between about 0.5 and about 40 mils.

7. A laminated product comprising at least two layers of glass having an interlayer disposed therebetween and in mating relationship therewith, said interlayer comprising the combination of a core layer of a normally solid, synthetic, thermoplastic polymer material selected from the group consisting of an ionic copolymer of an α-olefin having up to and including six carbon atoms per molecule and an α,β-ethylenically unsaturated carboxylic acid selected from the group consisting of monocarboxylic acids and dicarboxylic acids each having up to and including eight carbon atoms per molecule, said ionic copolymer having at least about 10 percent of the carboxylic groups ionized by neutralization with a salt-forming cation; a copolymer of an aliphatic conjugated diolefin having between four and six carbon atoms per molecule and an alkenyl aromatic compound having up to and including 12 carbon atoms per molecule; alkyl ethers of cellulose wherein each alkyl group of said ether contains up to and including seven carbon atoms per molecule; organic acid esters of cellulose wherein each organic acid group of said ester contains up to and including seven carbon atoms per molecule; polyurethane; nylon; polycarbonate; and plasticized poly(vinyl chloride); said core layer having an ultimate tensile strength of at least about 1,000 psi, an ultimate elongation of at least about 25 percent, the ultimate tensile strength and the ultimate elongation as determined by ASTM Designation D638-68 at a rate of 5,000 inches per minute, and, when the ultimate tensile strength is between about 1,000 and about 3,500 psi, said core layer has an ultimate elongation in percent which is at least equal to the value obtained by by the expression $$UE_{1000-3500} = 270 - (0.07)(\text{ultimate tensile strength});$$

and a load distribution layer on either side of and bonded to said core layer, said load distribution layer being fabricated of a normally solid, synthetic, thermoplastic polymer material selected from the group consisting of an ethylene polymer, a polymer of an aliphatic conjugated diolefin having between four and six carbon atoms per molecule, and a copolymer of an aliphatic conjugated diolefin having between four and six carbon atoms per molecule and an alkenyl aromatic compound having up to and including 12 carbon atoms per molecule, said load distribution layer having a minimum height to puncture of at least about 1 inch and a minimum height to tear of at least about 1 and ½ inches as determined by ASTM Designation D2582-67 using a one-quarter pound carriage and when said load distribution layer is torn by being subjected to the tear propagation procedure set forth in ASTM Designation D1938-67, the resulting edges of the tear are wavy and uneven.

8. A laminated product according to claim 7 wherein said core layer has a thickness of between about 4 and about 200 mils and each of said load distribution layers has a thickness of between about 0.5 and about 40 mils.

9. A laminated product according to claim 7 wherein said copolymer in said core layer has between about 20 and about 60 weight percent aliphatic conjugated diolefin and between about 40 and about 80 weight percent alkenyl aromatic compound and wherein said copolymer in said load distribution layer has at least about 10 weight percent conjugated diolefin based upon the total weight of said copolymer in said load distribution layer.

10. A laminated product according to claim 7 wherein said copolymer in said load distribution layer is a block copolymer.

11. A laminated product comprising at least two layers of glass having an interlayer disposed therebetween and in mating relationship therewith, said interlayer comprising the combination of a core layer of a normally solid, synthetic, organic polymer material having an ultimate tensile strength of at least about 1,000 psi, an ultimate elongation of at least about 25 percent, the ultimate tensile strength and the ultimate elongation as determined by ASTM Designation D638-68 at a rate of 5,000 inches per minute, and, when the ultimate tensile strength is between about 1,000 and about 3,500 psi, the polymer material of the core layer has an ultimate elongation in percent which is at least equal to the value obtained by the expression $$UE_{1000-3500} = 270 - (0.07)(\text{ultimate tensile strength})$$

and a load distribution layer on either side of and bonded to said core layer, said load distribution layer being fabricated of a normally solid, synthetic, organic polymer material having a minimum height to puncture of at least about 1 inch and a minimum height to tear of at least about 1 and ½ inches as determined by ASTM Designation D2582-67 using a ¼ pound carriage and when the polymer material of said load distribution layer is torn by being subjected to the tear propagation procedure set forth in ASTM Designation D1938-67, the resulting edges of the tear are wavy and uneven.

12. A laminated product according to claim 11 wherein said core has a thickness of between about 4 and about 200 mils and each of said load distribution layers has a thickness of between about 0.5 and about 40 mils.

* * * * *